INVENTOR.
ARTHUR P. KELLER
IRVIN C. SIMON
BY
Beau, Brooks, Buckley & Beau
ATTORNEYS

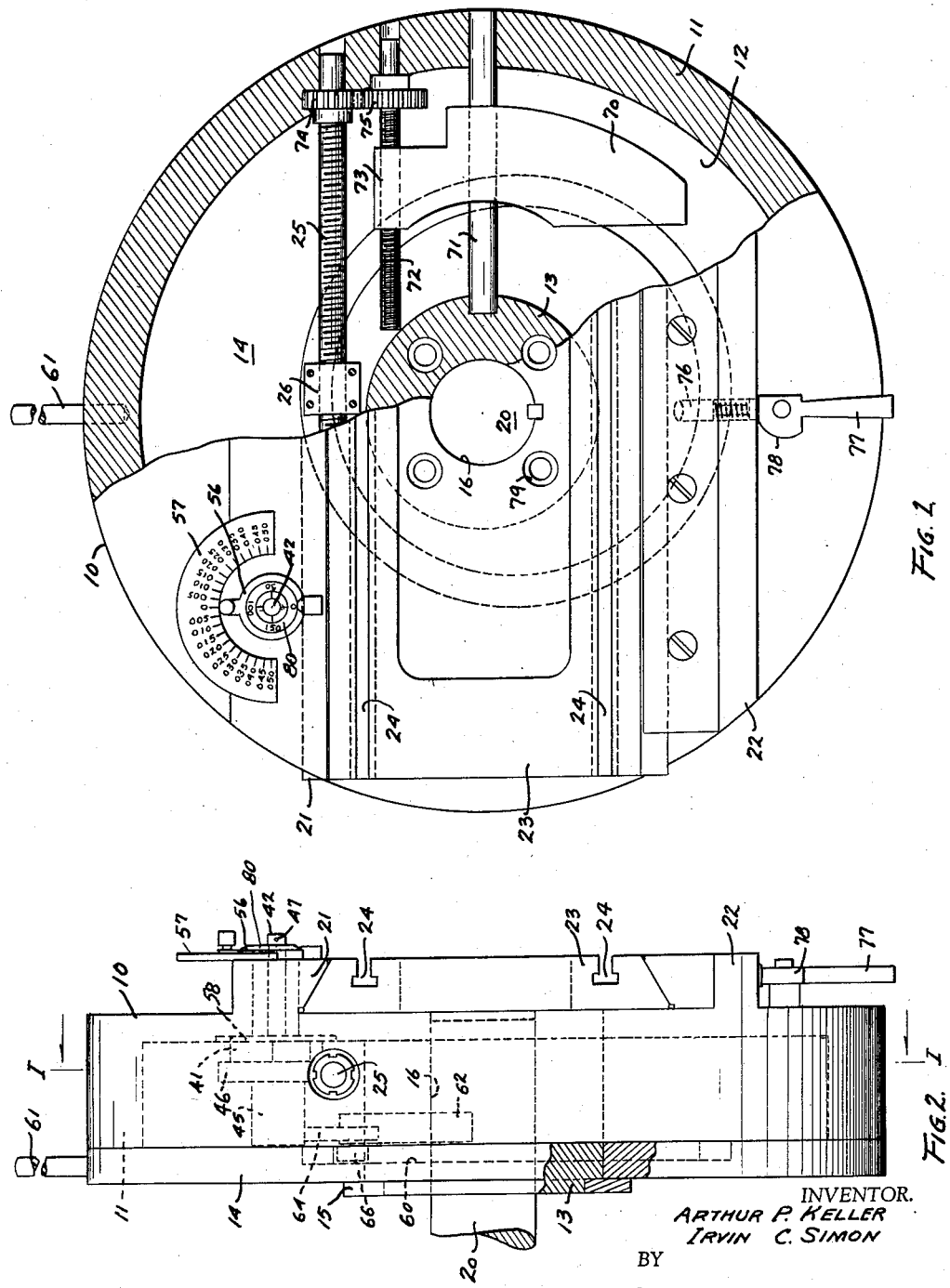

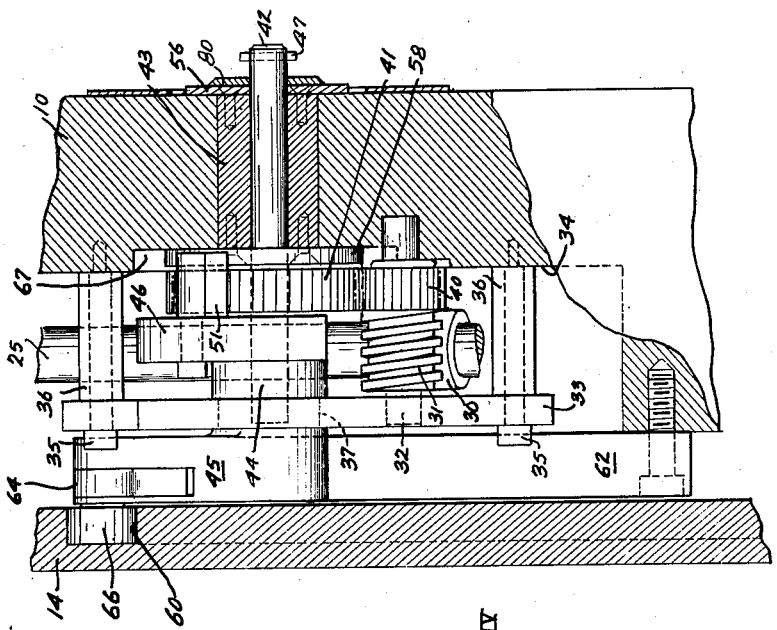
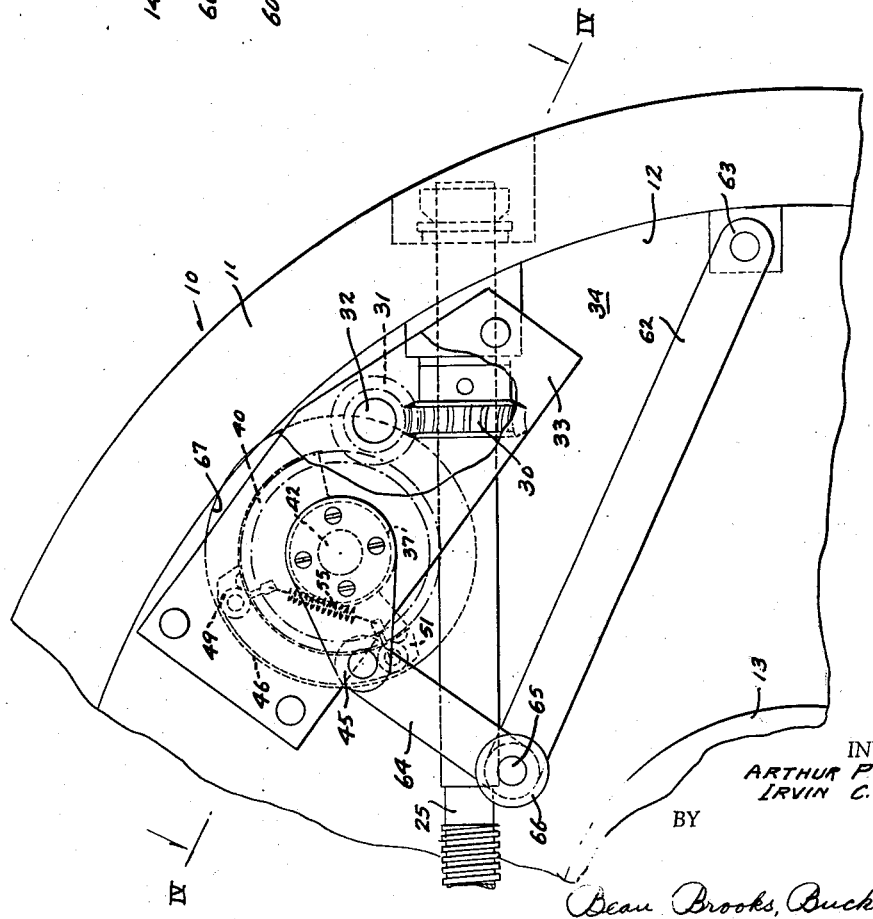

United States Patent Office 2,901,935
Patented Sept. 1, 1959

2,901,935
FACING HEADS

Arthur P. Keller, Jr., Williamsville, and Irvin C. Simon, Tonawanda, N.Y., assignors to J. & A. Keller Machine Company, Inc., Tonawanda, N.Y.

Application May 10, 1957, Serial No. 658,363

10 Claims. (Cl. 82—1)

Our invention relates in general to a facing head, and more particularly to a cutting head for use on machine tools, such as boring mills.

The principal object of our invention has been to provide a rotating facing head for laterally feeding a cutting tool automatically across the surface of the workpiece as the head is rotating.

A further object is to provide a counterweight for the tool head which will be automatically adjusted to compensate for the changing position of the tool and tool carrying slide as the cutting tool is moved laterally across the workpiece.

Another object is to provide readily adjusted means for changing the feed of the cutting tool from zero to an indicated amount in either radial direction.

Moreover, our device provides novel double acting ratchet means for feeding the tool slide of the facing head, means being provided for controlling at will the number of teeth engaged by the ratchet pawls.

Furthermore, our device is neat in appearance, occupies relatively small space, and has relatively few parts, assuring long care-free performance.

The above objects and advantages have been accomplished by the device shown in the accompanying drawings, of which:

Fig. 1 is a face view of our device, with portions broken away and other portions in section on line I—I of Fig. 2;

Fig. 2 is a side elevation thereof;

Fig. 3 is an enlarged fragmentary rear elevation with portions of the device broken away and removed;

Fig. 4 is a fragmentary sectional elevation taken on line IV—IV of Fig. 3;

Figure 5:
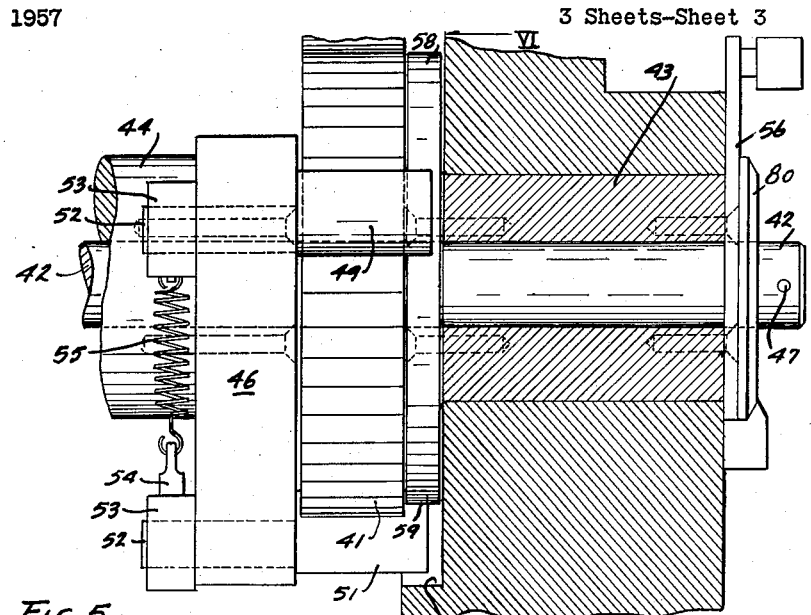
Fig. 5 is an enlarged side elevation of the ratchet means employed in our device.

Our device comprises a housing 10 annular in form and provided with an upstanding annular flange 11 forming a central recess 12. The housing is provided with a hub 13 upon which is rotatably mounted a cam plate 14. The cam plate is held in place upon the hub by means of a retaining plate 15. The hub 13 is provided with a bore 16 for the reception of the spindle 20 of the machine tool. The hub may be provided with a plurality of counterbored holes 79 whereby the head may be bolted to the face plate of the boring mill, if desired.

The housing is formed on its outer face with ways 21 and 22 for the sliding reception and support of a cross slide 23. This slide is provided with the usual T-shaped slots 24 for the reception of bolts, not shown, whereby a cutting tool (not shown) may be clamped in position upon the slide.

The slide 23 is actuated by means of a feed screw 25 which engages a nut 26 carried by the slide. This screw is supported at both ends by the flange 11 of the head, and a worm gear 30 is mounted upon one end thereof. This worm gear is engaged by a worm 31 fixed upon a worm shaft 32 which is rotatably supported at one end by the head 10 and at the other end by a bearing plate 33. The bearing plate is held in spaced relation with the bottom surface 34 of the recess 12 of the head by means of bolts 35 and spacers 36. A gear pinion 40 which meshes with a ratchet gear wheel 41 is also fixed upon the shaft 32 and it is rotatable with the worm 31. The ratchet gear wheel is nonrotatably mounted upon a gear wheel shaft 42 which is rotatably disposed within a pawl control sleeve 43 rotatably carried by the housing. The hub 44 of a crank arm 45 is preferably separate from the crank arm and it is formed with a reduced diametrical portion 37 for bearing support in the bearing plate 33. The end of the hub 44 having the smaller diameter is secured to the crank arm 45 by suitable means thus permitting assembly of the crank arm and the hub in the bearing plate. The crank arm and hub are rotatably carried by the inner end of the shaft 42 whereby they will be free to oscillate irrespective of rotative movement of the gear wheel shaft.

Figure 6:
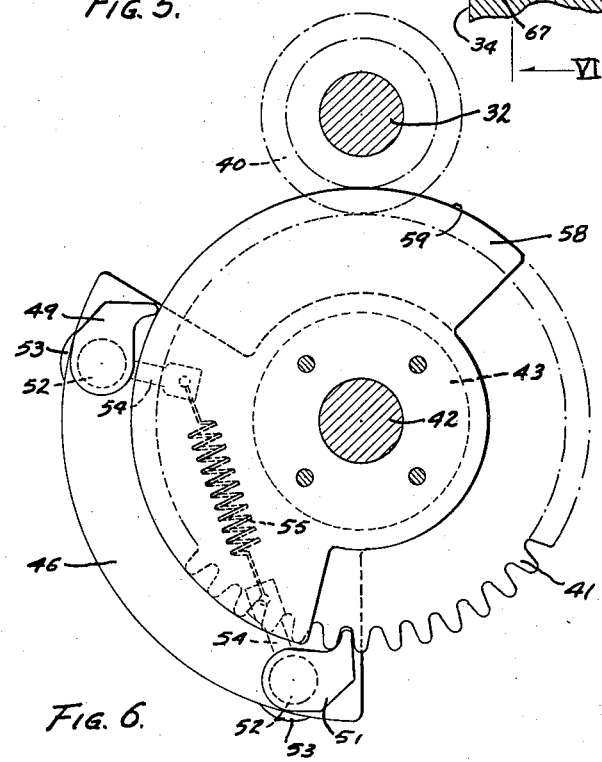
Fig. 6 is a sectional elevation of the ratchet means taken on line VI—VI of Fig. 5.

As shown in Figs. 5 and 6, a ratchet pawl plate 46 is fixed to the outer end of the hub 44 and it is provided with two oppositely arranged ratchet pawls 49 and 51 which are rotatably mounted thereon. Each of these pawls is fixed to or made a part of a shaft 52 which extends through and is rotatably disposed in the pawl plate. A collar 53 is fixed upon the outer end of each of the shafts 52 and each is formed with a radial arm 54 for the reception of one end of a helical spring arm 55. The spring, as shown in Fig. 6, connects the radial arms and serves to keep the pawls pressed inwardly in contact with the engaged ratchet tooth of the ratchet wheel or with a control plate 58. This control plate is disposed within a recess 67 formed in the surface 34 of the housing and it is rigidly attached to the pawl control sleeve 43. The control plate is formed with a segmental periphery 59 which is concentric with ratchet wheel 41 and which is of substantially the same diameter as the outer diameter thereof. This control plate is designed to select the number of teeth of the ratchet wheel which will be engaged by either of the ratchet pawls as the pawl plate is oscillated. In order to adjust the control plate 58 to alter the amount of tool feed for each revolution of the head, I provide an index lever 56 which is rigidly attached to the outer end of the pawl control sleeve 43. This lever is movable over a graduated dial 57 carried by the head. An indicator plate 80 is disposed on the face of the dial 57 and it is fixed to the shaft 42 whereby movement of the tool slide will be indicated. The outer end of the crank arm shaft 42 extends through the control plate and pawl control sleeve 43 and projects beyond the index lever where it is provided with a diametrically disposed pin 47, whereby the position of the slide may be changed manually by the operator by means of a suitable crank handle (not shown).

In order to oscillate the crank arm 45 and ratchet pawl plate, we provide the cam plate 14 with an annular groove 60 in its inner face. This groove is preferably cylindrical but is arranged eccentrically with respect to the bore 16 of the housing. The cam plate is held against rotation with the head by means of one or more pins 61 carried by the cam plate and engageable with a stationary part of the machine tool. A rocker arm 62 is pivoted at its inner end 63 to the housing flange 11 and its outer end is pivotally attached to a link 64, thereby acting as a drag member for said link. The link 64 and arm 62 are pivotally united by means of a pivot pin 65, and the pin 65 carries a roller 66 which is disposed within the groove 60 of the cam plate. The link 64 has its upper end pivotally united to the crank arm 45, whereby rotation of the head will cause the crank arm and ratchet pawl plate to be oscillated. As the ratchet pawl plate is oscillated, the selected pawl will engage a predetermined number of teeth of the ratchet wheel and will, therefore, serve to rotate the ratchet wheel 41, the pinion 40, the worm 31, the worm wheel 30 and attached feed screw 25 in one direction. Movement of the feed screw will cause the cutting tool (not shown) carried by the slide 23 to be fed laterally to the work during each rotation of the head.

In order to balance the head as it is rotated and as the slide is moved from one side of the head to the other, we provide a counterbalance 70 which is slidably mounted upon a guide rod 71 mounted in the flange 11 and hub 13 of the head. A feed screw 72 has one end rotatably supported by the flange of the head and its other end passed through an upwardly projecting arm 73 of the counterweight. Meshing gears 74 and 75 are carried by the feed screws 25 and 72, respectively, which will cause the feed screw 72 to be rotated when the feed screw 25 is actuated.

As shown in Fig. 6, the parts are so adjusted that when the ratchet pawl plate is oscillated in clockwise direction the ratchet pawl 51 will become disengaged from the tooth of the ratchet wheel and will rise to the peripheral surface 59 of the control plate where it will freely ride to the end of the oscillatory movement. Upon its return counterclockwise movement, the pawl will drop over the end of the periphery of the pawl control plate and will engage the adjacent tooth of the ratchet wheel. Assuming that the position shown in Fig. 6 represents the end of the counterclockwise movement of the ratchet pawl plate, then the ratchet gear wheel will be rotated an amount equivalent to the distance between the two selected teeth. When ratchet pawl 51 is being used, ratchet pawl 49 will be moved back and forth over the peripheral surface 59 of the pawl control plate and held thereby out of engagement with the teeth of the ratchet wheel. Obviously, if it is desired to increase the cut of the cutting tool, the ratchet control plate will be adjusted relatively to the ratchet pawl plate by means of the index lever 56 so as to expose the desired number of teeth, whereby when the ratchet pawl plate is oscillated, the ratchet wheel will be rotated an amount corresponding to the engagement of the ratchet pawl with the predetermined number of teeth. When it is desired to actuate the slide in the opposite direction, the control plate is rotated by means of the index lever 56 and pawl control sleeve 43 in counterclockwise direction until the number of teeth, which will give the desired amount of feed, have been exposed to engagement of the ratchet pawl 49. When it is desired to move the slide manually, a suitable crank (not shown) is attached to the outer projecting end of the crank arm shaft 42 by which the feed screw 25 may be rotated.

The slide 23 may, if desired, be locked in any position by means of a lock pin 76 which is actuated to the locking position by means of a lock lever 77 having a cam surface 78. Locking of the tool slide permits a boring operation upon a workpiece and subsequent facing or grooving operation at the inner end of the bore.

Obviously, while we have shown the groove in the cam plate of circular form and eccentrically arranged in relation to the axis of rotation of the head, this groove may be of any cam shape that will cause the ratchet pawl plate to oscillate. These and other modifications may be made without departing from the spirit of the invention or the scope of the appended claims.

What is claimed is:

1. A facing head, comprising a rotatable housing, a laterally disposed tool-carrying member slidably mounted upon said housing, a feed screw carried by said housing and operatively connected to said tool-carrying member, a cam plate mounted upon said housing and formed with a cam surface, stationarily positioned means for preventing rotaion of said cam plate with said housing, means carried by said housing and engageable with said cam groove for rotating said screw to feed said member, a radially disposed guide rod carried by said housing and having its axis in parallel relation with the axis of said feed screw; a counterbalance slidably carried by said guide rod, screw means for actuating said counterbalance, said screw means having its axis substantially parallel to the axis of said feed screw and means connecting said feed screw with said screw means for actuating the latter when the tool-carrying slide is adjusted.

2. A facing head for feeding a cutting tool across the surface of a workpiece, comprising a drive shaft, a fixed cam plate having an annular cam extending eccentrically about the shaft axis, a rotary housing driven by the shaft and having a recess opening toward the plate, a tool-carrying slide adjustable across the rotary housing, a screw within the recess and operatively connected to the slide for adjusting it, a gear wheel shaft rotatably supported by said housing a ratchet gear wheel fixed to said shaft and operatively connected to rotate the slide-adjusting screw, gear means supported by said housing and meshing with said ratchet gear wheel, said gear means being operatively connected to said screw, a single oscillating pawl plate disposed adjacent said ratchet wheel, and means for imparting intermittent movement to the gear wheel and including a crank arm rockable by the cam during rotation of the housing.

3. A facing head for feeding a cutting tool across the surface of a workpiece, comprising a drive shaft, a fixed cam plate having an annular cam extending eccentrically about the shaft axis, a rotary housing driven by the shaft and having a recess opening toward the plate, a tool carrying slide adjustable across the rotary housing, a bearing plate mounted in said housing a screw within the recess and operatively connected to the slide for adjusting it, gear means connected to said screw and supported by said plate a ratchet gear wheel in mesh with said gear means and operatively connected thereto, means for imparting intermittent movement to the gear wheel, said imparting means including a crank arm rockable by the cam during rotation of the housing, and pawl means rockable by the crank arm over the teeth of the gear wheel to impart increments of movement intermittently thereto.

4. A facing head for feeding a cutting tool across the surface of a workpiece, comprising a drive shaft, a fixed cam plate having an annular cam extending eccentrically about the shaft axis, a rotary housing driven by the shaft and having a recess opening toward the plate, a tool-carrying slide adjustable across the rotary housing, a screw within the recess and operatively connected to the slide for adjusting it, gear means connected to said screw and supported by said plate a ratchet gear wheel in mesh with said gear means and operatively connected thereto, means for imparting intermittent movement to the gear wheel comprising a crank arm rockable by said cam during rotation of said housing, said crank arm being operatively connected to said cam by a link, and a rocker arm connecting the rotating body to the cam-engaging end of the link to serve as a drag member therefor.

5. A rotatable facing head for carrying a cutting tool laterally across a workpiece comprising a rotatable housing formed with a recess, a laterally disposed tool-carrying member slidably mounted upon said housing, a stationarily arranged cam plate mounted upon said housing and closing the recess thereof and being formed with a cam groove in the recess, screw means carried by said head and operatively connected to said tool-carrying member, a ratchet gear wheel rotatably carried by said housing, gear means meshing with said ratchet gear wheel and connecting said gear wheel with said screw, a single oscillating pawl plate adjacent to said ratchet wheel, a ratchet pawl disposed at each end of said pawl plate and selectively engageable with teeth of said ratchet wheel, means for adjusting the relative position of said control plate with respect to said pawl plate to adjust the amount of movement of tool-carrying member, and means carried by said housing and engaging said cam groove for oscillating said pawl plate.

6. A rotatable facing head for carrying a cutting tool laterally across a workpiece, comprising a revolving housing formed with a recess, a lateral tool-carrying member slidably mounted upon said housing, a stationarily arranged cam plate closing the housing recess and being formed with a cam groove in the recess, a rocker arm pivotally mounted on said housing and having its opposite end cooperatively engaging the cam groove to oscillate said arm within said recess, a crank arm rotatably mounted within and carried by said housing, a link connecting said crank arm to the rocker arm for rocking said crank arm, a pawl control bushing adjustably mounted in said housing, an adjustable pawl control plate mounted in said recess and attached to said bushing, a gear wheel shaft rotatably mounted within said housing, a ratchet gear wheel fixed to said gear wheel shaft and disposed adjacent said pawl control plate, said control plate having a segmental periphery of substantially the same radius as the radius of said gear wheel, a pawl plate oscillated by said crank arm disposed adjacent said gear wheel and operable to selectively expose a predetermined number of teeth on the latter, a pawl carried by said pawl plate for engagement with the exposed teeth of said gear wheel, and means operatively connecting said gear wheel to said tool-carrying member to effect instrumental adjustment thereof.

7. A rotatable facing head for carrying a cutting tool laterally across a workpiece, comprising a revolving housing formed with a recess, a lateral tool-carrying member slidably mounted upon said housing, a stationarily arranged cam plate closing the housing recess and being formed with a cam groove in the recess, a rocker arm pivotally mounted on said housing and having its opposite end cooperatively engaging the cam groove to oscillate said arm within said recess, a crank arm rotatably mounted within and carried by said housing, a link connecting said crank arm to the rocker arm for rocking said crank arm, a pawl control bushing adjustably mounted in said housing, an adjustable pawl control plate mounted in said recess and attached to said bushing, a dial indicator carried by said housing and attached to the outer end of said bushing for adjusting the position of said control plate, a gear wheel shaft rotatably mounted within said housing, a ratchet gear wheel fixed to said gear wheel shaft and disposed adjacent said pawl control plate, said control plate having a segmental periphery of substantially the same radius as the radius of said gear wheel, a pawl plate oscillated by said crank arm disposed adjacent said gear wheel and operable to selectively expose a predetermined number of teeth on the latter, a pawl carried by said pawl plate for engagement with the exposed teeth of said gear wheel, and means operatively connecting said gear wheel to said tool-carrying member to effect instrumental adjustment thereof.

8. A rotatable facing head for carrying a cutting tool laterally across a workpiece, comprising a revolving housing formed with a recess, a lateral tool-carrying member slidably mounted upon said housing, a stationarily arranged cam plate closing the housing recess and being formed with a cam groove in the recess, a rocker arm pivotally mounted on said housing and having its opposite end cooperatively engaging the cam groove to oscillate said arm within said recess, a bearing plate mounted in said recess and disposed in spaced relation with the outer face wall of said housing, a crank arm rotatably mounted within and carried by said bearing plate, a link connecting said crank arm to the rocker arm for rocking said crank arm, an adjustable pawl control plate adjustably mounted in said recess, a gear wheel shaft rotatably mounted within said housing, a ratchet gear wheel rotatably mounted in said housing, and disposed adjacent said pawl control plate, said control plate having a segmental periphery of substantially the same radius as the radius of said gear wheel, a pawl plate oscillated by said crank arm disposed adjacent said gear wheel and operable to selectively expose a predetermined number of teeth on the latter, a pawl carried by said pawl plate for engagement with the exposed teeth of said gear wheel, and means operatively connecting said gear wheel to said tool-carrying member to effect instrumental adjustment thereof.

9. A rotatable facing head for carrying a cutting tool laterally across a workpiece, comprising a revolving housing formed with a recess, a lateral tool-carrying member slidably mounted upon said housing, a stationarily arranged cam plate closing the housing recess and being formed with a cam groove in the recess, a rocker arm pivotally mounted on said housing and having its opposite end cooperatively engaging the cam groove to oscillate said arm within said recess, a bearing plate mounted in said recess and disposed in spaced relation with the outer face wall of said housing, a crank arm rotatably mounted within and carried by said bearing plate, a link connecting said crank arm to the rocker arm for rocking said crank arm, a pawl control bushing adjustably mounted in said housing, an adjustable pawl control plate mounted in said recess and attached to said bushing, a gear wheel shaft rotatably mounted within said bushing, a ratchet gear wheel fixed to said gear wheel shaft and disposed adjacent said pawl control plate, said control plate having a segmental periphery of substantially the same radius as the radius of said gear wheel, a pawl plate oscillated by said crank arm disposed adjacent said gear wheel and operable to selectively expose a predetermined number of teeth on the latter, a pawl carried by said pawl plate for engagement with the exposed teeth of said gear wheel, and means operatively connecting said gear wheel to said tool-carrying member to effect instrumental adjustment thereof.

10. A rotatable facing head for carrying a cutting tool laterally across a workpiece, comprising a revolving housing formed with a recess, a lateral tool-carrying member slidably mounted upon said housing, a stationarily arranged cam plate closing the housing recess and being formed with a cam groove in the recess, a rocker arm pivotally mounted on said housing and having its opposite end cooperatively engaging the cam groove to oscillate said arm within said recess, a bearing plate mounted in said recess and disposed in spaced relation with the outer face wall of said housing, a crank arm rotatably mounted within and carried by said bearing plate, a link connecting said crank arm to the rocker arm for rocking said crank arm, a pawl control bushing adjustably mounted in said housing, an adjustable pawl control plate mounted in said recess and attached to said bushing, a gear wheel shaft rotatably mounted within said bushing, a ratchet gear wheel fixed to said gear wheel shaft and disposed adjacent said pawl control plate, said control plate having a segmental periphery of substantially the same radius as the radius of said gear wheel, a pawl plate oscillated by said crank arm adjacent said gear wheel and operable to selectively expose a predetermined number of teeth on the latter, a pawl carried by said pawl plate for engagement with the exposed teeth of said gear wheel, means operatively connecting said gear wheel to said tool-carrying member to effect instrumental adjustment thereof, and manual means to effect preliminary setting of said tool-carrying member.

References Cited in the file of this patent

UNITED STATES PATENTS

| | | |
|---|---|---|
| 1,181,580 | Dreses | May 2, 1916 |
| 2,046,462 | Jorgenson | July 7, 1936 |
| 2,138,722 | Beers | Nov. 29, 1938 |
| 2,221,638 | Indge | Nov. 12, 1940 |
| 2,520,342 | Ross | Aug. 29, 1950 |
| 2,521,900 | Clark | Sept. 12, 1950 |

OTHER REFERENCES

"Machinery," March 2, 1950, page 312 relied on. (Copy in Scientific Library and Div. 58 class 77–36.)